Jan. 24, 1967 W. WITT ETAL 3,299,770
LIGHT TO ELECTRICAL ENERGY TRANSFORMING APPARATUS FOR
CONTINUOUSLY INDICATING THE INDEX OF REFRACTION
Filed Sept. 22, 1961 2 Sheets-Sheet 2
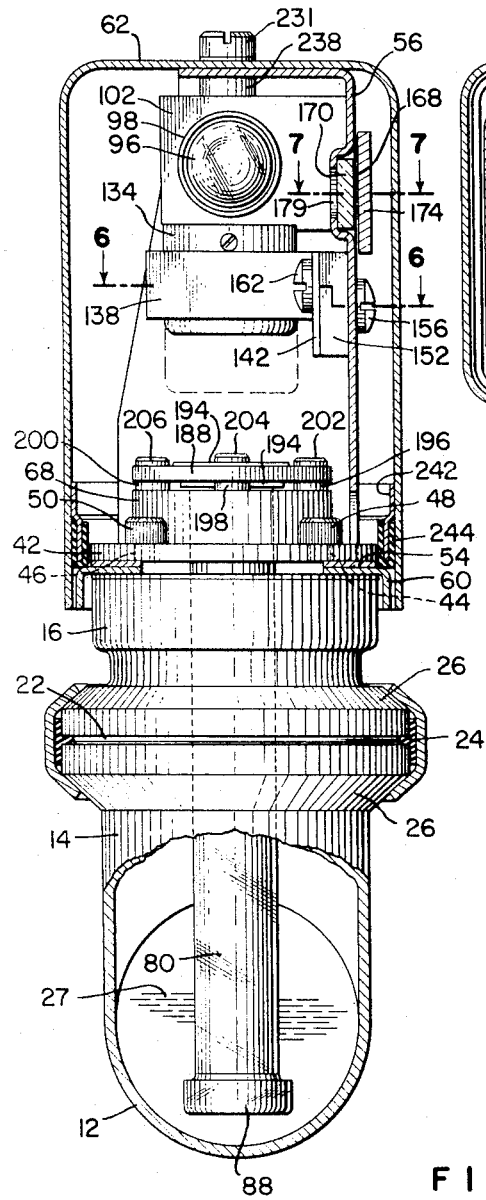
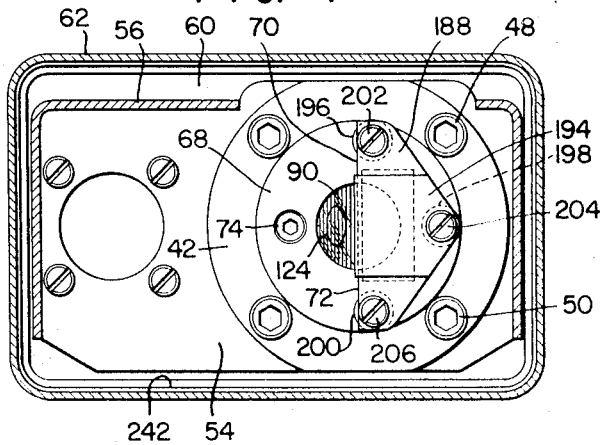
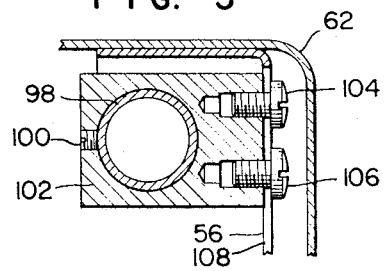
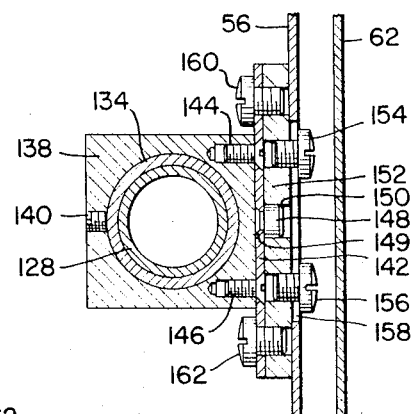
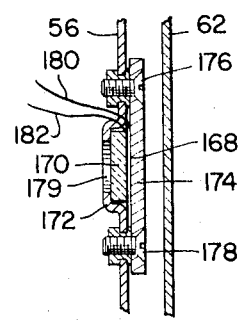
*INVENTORS.*
WALTER WITT
ROBERT MAYER
BY
*Arthur H. Swanson*
ATTORNEY.

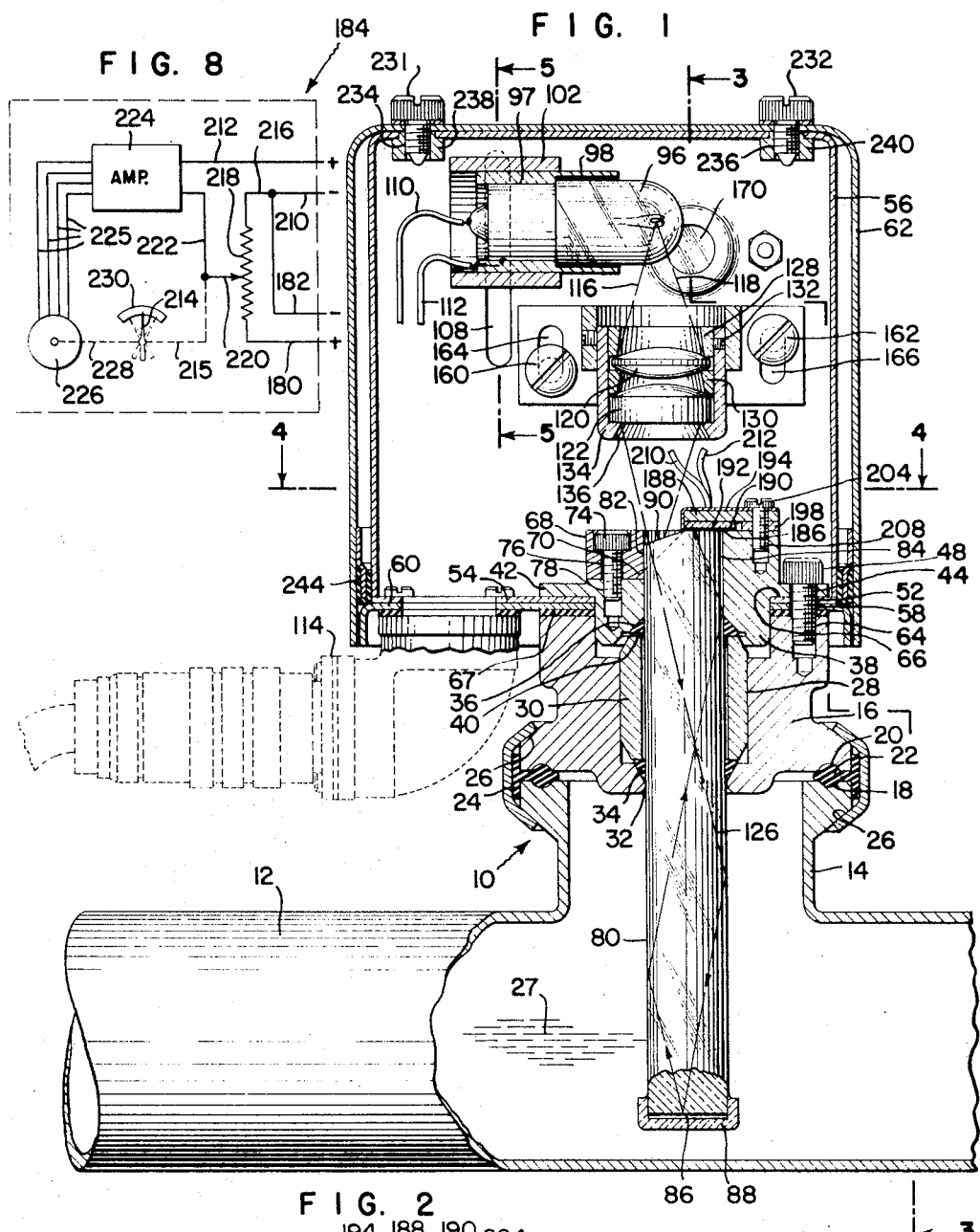

United States Patent Office 3,299,770
Patented Jan. 24, 1967

3,299,770
LIGHT TO ELECTRICAL ENERGY TRANSFORMING APPARATUS FOR CONTINUOUSLY INDICATING THE INDEX OF REFRACTION
Walter Witt, Philadelphia, and Robert Mayer, Ardmore, Pa., assignors to Honeywell Inc., a corporation of Delaware
Filed Sept. 22, 1961, Ser. No. 140,050
7 Claims. (Cl. 88—14)

The general object of the present invention is to provide a measuring apparatus that is useful in measuring the index of refraction of a fluid.

Another object of the invention is to provide an improved measuring apparatus of the aforementioned type having an immersion type light transmitting probe unit which is useful in producing an electrical signal proportional to density, specific gravity, degree brix or other characteristics of a fluid under measurement which varies in accordance with changes in the index of refraction of this fluid.

More specifically it is another object of the invention to provide improvements in the fluid immersion type light transmitting probe disclosed in the Walter Witt et al. patent application Serial No. 9,260 filed February 17, 1960, now U.S. Patent No. 3,163,767, wherein a portion of the light entry end of the improved probe to be disclosed herein is provided with a preselected beveled edge surface.

It is another object of the invention to provide an adjustable light source and lens system which is juxtapositioned with respect to the light entry end of the improved probe disclosed herein to thereby enable light rays from the light source to hit the aforementioned selected beveled surface at a preselected entry angle.

It is an object of the invention to provide an improved immersion type light transmitting probe which will enable a certain preselected number of light rays to be directed in a substantially perpendicular manner against a beveled surface of a transparent probe and thence through the probe directly against peripheral side wall surfaces of this probe at a preselected critical angle.

It is still another object of the invention to provide a light transmitting probe of the aforementioned type having a two-part mask to prevent ambient light from entering the light entry end of the probe when the aforementioned angle selected for the bevel on this end is of a substantially acute angle with the top of the probe.

It is still another object of the present invention to provide a two-part mask of the aforementioned type which may have one of its parts removed when the angle selected for this bevel of the probe is greater than an acute angle to thereby allow the light entering the probe to hit the peripheral side surface of the probe at a desired preselected critical angle.

In the drawing:

FIG. 1 of the drawing is a sectional view showing the aforementioned immersion type light transmitting probe unit mounted in a flow conduit;

FIG. 2 shows a different type of beveled end surface for a probe from that shown in FIG. 1;

FIG. 3 shows an elevation view taken along line 3—3 of FIG. 1;

FIG. 4 shows a plan view taken along line 4—4 of FIG. 1;

FIG. 5 is a sectional view taken along line 5—5 of FIG. 1;

FIG. 6 is a sectional view taken along line 6—6 of FIG. 2;

FIG. 7 is a sectional view taken along line 7—7 of FIG. 2;

FIG. 8 is a schematic of how the light measuring apparatus shown in the previously mentioned figures can be operably connected to an indicating recorder.

The aforementioned referred to light probe unit is readily identified as reference numeral 10. A section of a flow conduit 12 is shown in FIG. 1 having an embossed stationary sleeve portion 14. A substantially cylindrical ferrule 16 is shown positioned above the embossed portion 14. A groove 18 extends in a ring-shaped manner along the upper surface of the sleeve portion 14 and a similar opposing groove 20 is shown in the lower surface of the ferrule 16. The respective lower and upper surfaces of a gasket 22 which is in the form of a ring is shown in contact with the opposing groove surfaces 18, 20. Additionally, the gasket 22 possesses a ring portion 24 surrounding the lower outer cylindrical surface of the ferrule 16 and the upper outer cylindrical surface of the sleeve portion 14.

A stainless steel snap-acting spring toggle actuated clamping member 26 which may be of a commercially available type, for example, a quick-release clamp commonly referred to in the sanitary fitting trade as a tri-clamp can be used to maintain the ferrule 16 and sleeve portion 14 in tight engagement when the clamping member 26 is placed in the clamped position shown in FIG. 1. When the ferrule 16 and sleeve portion 14 are clamped together in this manner the gasket 22 will be depressed to a degree that will seal the space between the ferrule 16 and the sleeve portion 14 and thus prevent the fluid 27 passing through the flow conduit 12 from seeping through this joint.

It should be understood that the aforementioned snap-acting spring actuated clamping member 26 is provided with a toggle mechainsm, not shown, which when manually actuated to a disconnect position provides a means to rapidly disconnect the removable ferrule 16 from the stationary sleeve position 14.

A central wall portion 28 of the ferrule 16 forms a cylindrical aperture therein. The outside wall surface of a compression sleeve 30 is shown in tight engagement with the wall portion 28 of the ferrule 16. Compressed between the lower end of the sleeve 30 and a cylindrical lip 32, formed on the inner end of the member 16, there is shown a first O-ring 34.

Between the upper end of the sleeve 30 and a beveled edge 36 of a substantially cylindrical shaped plate 38 there is shown a second O-ring 40. FIGS. 1 and 2 also show the sleeve 30 as having a substantially circular flange 42. This flange is provided with a suitable number of holes such as is shown at 44, 46 through which screws 48, 50 can pass. These screws 48, 50 pass through a wall forming an aperture 52 in the base plate 54 of the support bracket plate 56 and through a wall forming an aperture 58 in the base 60 of the rectangular case 62. The lower end of each of these screws is threadedly mounted in a tapped hole in the ferrule 16 in the manner as shown at 64 for the screw 48.

When screw 48 and the other screws are tightened the lower surface of the flange 42 and the upper surface of the base plate 54 will be brought into snug contact with one another along contacting surface 66 as shown in FIG. 1. When this occurs an O-ring 40 that is shown inserted in the beveled edge portion 36 in the lower surface of the plate 38 will be forced into a compressed position against the top of sleeve 30 and gasket 67 through which the screws pass will similarly be compressed.

A plate 68 is shown in FIGS. 1 and 4 contacting the upper end of the plate 38 along the contacting edges 70, 72. A taped bolt 74 is shown passing through a bored out aperture 76 in plate 68 and held in threaded engagement at 78 with the plate 38. The plate 68 and its associated plate 38 thus form a mask for preventing stray or other undesired ambient light within the case 62 from entering the upper peripheral surface of the transparent light transmitting rod 80 when the beveled surface 90 on the top of the rod is of an acute angle as shown in FIG. 1.

The inner diametral wall portion 82 of the plate 38, the inner diametral wall portion 84 of the plate 38, the inner diametral wall surface of the sleeve 30 and the inner diametral wall surface of the lip 32 of the member 16 are each spaced at a distance from the transparent light transmitting probe 80 which will prevent them from contacting this probe.

The probe 80 is contacted and retained in a supported position solely by means of the O-ring seals 34, 40. This probe 80 may be made of a transparent material such as glass which possesses a higher index of refraction than that possessed by the fluid 27 that is in the conduit 12. The uppermost end of the transparent light transmitting probe 80 is shown at the same level as the flat upper surface of the plate 38.

The end of the aforementioned probe 80 can if desired include a light reflecting surface 86 and the cap 88 which may be of the type disclosed in the Walter Witt et al. patent application Serial No. 9,260 filed February 17, 1960, which is assigned to the same assignee as that to which the present application is assigned.

While the various figures of the drawing disclosed the light probe unit 10 mounted on a wall of the conduit it should be understood that in some applications it may be preferred to mount the probe unit 10 in the portion of the conduit 12 to which it is connected at a position that is rotated ninety degrees, one hundred and eighty degrees, or any other number of desired degrees in either direction from the position shown in FIG. 1 of the drawing.

One of the features of the present invention which is shown in FIG. 1 of the drawing is that the upper end of the probe is provided with a preselected beveled edge 90 which, as shown, is at an acute angle with the upper flat end of the probe 80. FIG. 2 shows still another probe 92 that can be substituted for the probe 80 shown in FIG. 1. The probe 92 differs from the probe 80 in that its beveled surface 94 is at a greater angle to its uppermost flat end surface.

An adjustable light source, shown as a light bulb 96, is fixedly mounted by solder along contacting surface 97 in a sleeve 98. This sleeve can be slidably fixed in a selected horizontal position by tightening a set screw 100 passing through a block member 102. The block member 102 shown in FIG. 5 can be slidably mounted in a selected vertical direction to the support plate 56 by loosening screws 104, 106 and allowing them to be slid along the slot 108 in the plate 56 to a desired position where they may be tightened, thereby, enabling the bulb 96 to be fixed in a desired vertical light emitting position.

The bulb 96 is shown having electrical leads 110, 112 which may pass through the light tight electric wire carrying conduit 114 to a suitable power supply not shown.

Light rays 116, 118 from the light source 96 are shown passing through the lenses 120, 122 so that bundles of light from the light bulb 96 can be focussed in the elliptical shape bundle form 124 against the beveled surface 90 as shown in FIGS. 1 and 4. By way of illustration one of these rays 126 which form this bundle of culminated light is shown entering the beveled surafce of rod 80.

A piar of tapered sleeves 128, 130 which are retained in place by means of set screw 132 retain the lenses 120, 122 in the position shown in the outer open ended cup member 134.

The cup member 134 is open at its upper end and has a sharp beveled wall 136 which forms a light cut off surface at its lower end. As can best be seen in FIG. 6, the cup member 134 is mounted on a block shaped member 138, which is provided with a set screw 140 to maintain this cup member 134 in any one of a number of selected desired vertical positions therein.

A rotatable pivot plate 142 is shown fixedly attached to the member 138 by means of screws 144, 146. A cylindrical shaped pivot pin 148 peened over at 149 against the plate 142 is shown pivoted at 150 in a second plate 152. This second plate 152 in turn is shown having two screws 154, 156 which may be slid along the wall surface 158 forming a slot in the support plate 56 to thereby position the center of the lenses 120, 122 to the right or left of the position shown for these lenses in FIG. 1.

Additional screws 160, 162 and slot connections 164, 166 are shown in FIG. 1 and FIG. 6 which allow for angular adjustment of these lenses 120, 122.

The aforementioned described adjustments for the bulb 96 and lenses 120, 122 thus make it possible to alter the position of these parts so that the filament will be at a preselected desired point with respect to these lenses. These adjustments also enable the center ray of the eliptical bundle of light rays to be focussed in a substantially perpendicular manner to the beveled edge so that the maximum amount of light which this bulb and lens system can afford will be sent through this beveled edge into the rod 80 against an immersed peripheral side wall of the rod 80 at a preselected desired critical angle.

FIGS. 1 and 7 of the drawing show a light sensing reference cell in the form of a solar cell 168, a filter 170 and glass filter-solar cell retaining plates 172, 174 held by means of the screws 176, 178 on support plate 56. The plate 172 contains an aperture formed by wall portion 179 therein to permit rays of light from the bulb 96 to be transmitted through the filter 170 to the reference cell 168. The filter 170 is made of a glass or other transparent material which possesses substantially the same light absorbing characteristics as the rod 80 so that the quantity of light lost as it passes through the filter will be the same as that which is lost to the rod due to absorption of the light from the bulb 96 after this light has been passed in a downward direction into and thence in an upward direction to the uppermost end of the rod 80.

This reference cell has electrical leads 180, 182, which are passed by way of the electric wire carrying conduit 114 to the ratio measuring circuit 184 shown in FIG. 8.

At the uppermost end of the rod there is shown a light sensing measuring cell which may be in the form of a rectangular shaped silicone solar cell 186. The light measuring cell 186 is fixedly connected by a suitable cement to the under surface of a triangular shaped block 188, made of a phenolic board, at its upper end and cemented to a light shield 190, having a wall portion 192 that forms a semi-circular opening therein of a slightly greater radius than the rod 80, at its lower end.

Another light shield 194 is shown covering a central portion of the top of the block 188 and extending in a downward direction into contact with the top of the rod 80 and at the uppermost end of the beveled surface 90.

Three rigid washers 196, 198, 200 are shown retaining the measuring cell 186 immediately adjacent the upper end of the rod 80. Suitable screw connections 202, 204, 206 are employed to connect the parts retained on the phenolic block 188 in threaded engagement with threads formed in the top part of the plate 38 in the manner shown at 208 in FIG. 1 of the drawing.

The measuring light sensing cell 186 has electrical leads 210, 212 which are passed by way of the electric wire carrying conduit 114 to the ratio measuring circuit 184 shown in FIG. 8.

If the intensity of the source of power not shown being applied to the light bulb 96 should for any reason be caused to decrease or increase the intensity of this light emitted by the bulb 96 would be varied. However, the value of the E.M.F. output signal of each of the light sensing measuring and reference cells 186, 168 will each likewise increase or decrease upon the occurrence of an increase or decrease in the intensity of the light emitted by the light bulb 96. From the aforementioned description it can thus be seen that since the effect of an increase or decrease in the intensity of the emitted light from bulb 96 will merely cause the simultaneous raising or lowering of the output E.M.F. signal of each of the light sensing cells an equal factor. Such a change in the ratio value that exists between the two E.M.F. that is fed into the measuring circuit by means of the conductors 180, 182, 210 and 212 will not be affected by such a light intensity change. However, it should be understood that a change that occurs in the index of refraction of the fluid 27 under measurement in flow conduit 12 will cause the output E.M.F. signal from the light sensing measuring cell 186 to change with respect to the output E.M.F. signal being produced by the light sensing reference cell 168. If the circuit shown in FIG. 8 is in a balanced null position the pointer 214 is in the position shown. When a change in the output of the aforementioned type in the E.M.F. signal takes place, this change in output signal will be fed by way of the conductor 210, 212 and 216 the upper portion of resistance 218, wiper 220, conductor 222 into the amplifier 224. This change will thus cause the E.M.F. to be applied across the amplifier by means of the electrical conductor connection 225 which will in turn cause the balancing motor 226 to move the wiper 220 to a position along the slidewire resistor 218 in such a direction that the E.M.F. drop that had been introduced across the amplifier will again be restored to a zero E.M.F. value. It should also be noted that with the conductors 180, 182 arranged in the manner shown in FIG. 8 of the drawing a true ratio of the E.M.F. signal of the measuring and reference cells 186, 168 will always be applied to the input of the ampifier 224. As the output signal of the amplifier 224 causes the slidewire wiper 220 to be moved along the resistor element 218 as noted supra the linkage 228 will simultaneously move the pointer along the scale 230 to, for example, either of the dotted line positions shown depending on whether the light loss was greater or less than the light loss that was present when the amplifier was in its initial balanced position. Regardless of which of the dotted line positions the pointer 214 is positioned, that position will represent the E.M.F. ratio that is then present between the measuring light sensing cell 186 and the reference sensing cell 168.

The balance bridge components including the electronic amplifier 224 balancing motor 226 together with the conductors 225 and component parts 228, 215, 222 which form the mechanical linkage are of the type similar to that which is disclosed in the W. P. Wills Patent 2,423,540 filed Dec. 1, 1941, issued July 8, 1947.

Since this E.M.F. ratio is directly proportional to the light that is lost due to a change in index of refraction of the fluid under measurement, the change in the solid line, position of the pointer 214 to either of the dotted line positions shown will indicate the extent to which the loss in light passing into and out of the uppermost end of the probe 80 has increased or decreased from a preselected pointer position. Such a light loss increase or decrease represents a change in index of refraction is taking place in the fluid under measurement. Since, as previously mentioned in the early part of the specification, the index of refraction can be used to measure density and other characteristics of fluid the dotted line positions of the pointer 214 on scale 230 can be calibrated so that they indicate accurately any one of these latter mentioned values.

The rectangular case 62 can be removed from the support bracket plate 56 by unthreading and removing the screws 230, 232 from the threads formed at 234, 236 in the boss portions 238, 240 formed integral with the plate 56.

A retaining ring 242 is used to maintain a gasket 244, which is of a U-shaped cross section, in water tight relation with the plate 60.

In operation, the end of the probe selected for the apparatus shown in FIG. 1 will have a beveled surface cut off at a preselected angle with the flat surface portion of this end which cut off angle will allow the probe to be used to measure the particular index of refraction of the fluid under measurement. The bevel surface of the probe can be previously mentioned be a beveled surface cut off at an acute angle as shown in FIG. 1.

It can be further seen from the aforementioned description that the index of refraction of fluids which have an index of refraction range that is different from that previously referred to, can also be readily measured by utilizing a probe whose end is cut off at another different angle that is suitable for the particular index of refraction of the fluid under measurement. The size of the last-mentioned selected cut off angle may lie between the cut off angle shown at 90 in FIG. 1 and the cut off beveled angle 94 shown in FIG. 2.

For example a first probe having a beveled edge cut off at the acute angle as shown in FIG. 1 can be used to measure the degree to which the index of refraction of any one of a first group of fluids differ from the index of refraction which each of these possesses when they are in a preselected condition.

A second probe having a beveled edge cut off at the angle which is shown in FIG. 2 can be used to measure the degree to which the index of refraction of any one of a second different group of fluids differ from the index of refraction which each of these fluids possess when they are in another preselected condition.

A third probe having a beveled edge cut off at an angle that lies between the cut off bevel angle of the first and second probes can be used to measure a degree to which the index of refraction of any one of a third different group of fluids differ from the index of refraction which each of these fluids possess when they are in still another preselected condition.

By selecting probes in the aforementioned manner for a flow line it is thus possible to measure the index of refraction of fluids and slurry mixtures such as various types of sugar solutions, alcohol puree, soups, acetic acid, hydrogenated fats, egg solids, tomato products, fruit butters, maple syrup, jellies, jams, fruit and berry preserves, fruit juices, condensed milk, carbonated beverages and any other fluid of slurry mixture which possesses an index of refraction which lies between 1.333 and 1.487 when a glass known in the glass art as Nonex is used for the probe.

Furthermore, it should be noted that each of these fluids when in a preselected condition possesses a known, narrow or wide range of index of refraction which lies within 1.333 to 1.487. It should be noted that the index of refraction range of measurement which the measuring apparatus disclosed herein is capable of measuring has only been cited by way of example for solutions which lie within preselected index of refraction measuring ranges. It should be understood that where it is desired to measure solutions whose range of index of refraction is above or below the index of refraction range 1.333 and 1.487 previously referred to that type of glass or other transparent materials having indexes of refraction differing from that referred to supra can be satisfactorily used for this purpose.

Refractive index of a fluid is =

$$\frac{\text{Velocity of Light in a vacuum}}{\text{Velocity of Light in a fluid}}$$

Snell's law dictates that the magnitude of the critical angle will be determined by the ratio of the refractive indices of the two mediums, in this case, the refractive index of the rod 80 and the index of the fluid 27. Therefore, any change in the refractive index of the fluid 27 will change the critical angle, which in turn will permit more or less light to pass between the rod 80 and the fluid 27.

In general as the density of the fluid increases the velocity of light will decrease thus increasing the refractive index of the fluid. Since the index of refraction will also depend upon the wave length of the light, prior index of refraction measuring devices have used monochromatic light such as a wave length of 5890 Angstrom units as a standard.

The index of refraction measuring apparatus disclosed herein does not indicate the refractive index of a fluid under measurement with reference to a specific wavelength. The index of refraction measuring apparatus disclosed herein measures the refractive index of a composite of wavelengths and is calibrated with the specific solution with which it will be used or equivalent, due to the dispersion of refractive index with different rod-fluid combinations.

It can thus be seen that as light rays from the incandescent light source 96 are collected and focused by the lenses 120, 122 upon the selected beveled surface e.g., 90 of the transparent probe 80 these light rays will initially spread out as they pass through the probe. These light rays will then strike the interface between the peripheral portions of the probe and the fluid at many different angles. Light rays which strike this interface at an angle less than the critical angle will have some component of its intensity transferred to the solution by refraction. Light rays striking this interface at an angle greater than the critical angle will be reflected back into the probe. Reflected light that remains in the probe when it reaches the lower end of the probe will be reflected back in a manner similar to that previously described for the light entering the probe, to the measuring cell 186 by the reflecting surface 86 at the end of the sensing probe 80.

The magnitude of the refractive index of the solution will determine the amount of light which will be refracted into the solution, the magnitude of the reflected light collected by the measuring cell 186 will thus be directly related to the refractive index of the fluid.

The aforementioned light entry angle selected is substantially perpendicular to the selected beveled surface 90 so that light rays emitted by light bulb 96 will be focused against various portions of the peripheral side wall of the probe 80 at the critical angle of incidence which is present between the fluid under measurement 27 and the probe 80 when the index of refraction of the fluid 27 coincides with the index of refraction that is desired for this fluid. When this condition is present no light will be refracted out of the side of the probe 64. All of the light rays entering the probe 64 under this condition will thus be either reflected against the peripheral side walls of the probe or be caused to travel in a reflected manner along longitudinal, peripheral surfaces of the rod. In either instance these light rays will not be refracted out of the probe 80. Under this condition the indicator 214 will show the index of refraction of the fluid under measurement 27 on scale 230 exactly coinciding with the value of the preselected desired index of refraction selected for the fluid.

In a similar manner to that already described it can be seen that when the value of the index of refraction of the aforementioned fluid under measurement is lower than the preselected value of the index of refraction selected and desired for this fluid 27, then, substantially all of the light entering the probe 80 will be reflected against the side of the probe 80 without incurring any loss in light by refraction to the fluid 27 that is in contact therewith. Under these conditions the indicator 214 will show the index of refraction of the fluid under measurement 27 on scale 230 slightly lower than the value of the preselected index of refraction selected and desired for this fluid.

If another condition exists in which the value of the index of refraction of the aforementioned fluid under measurement is higher than the preselected value of the index of refraction selected and desired for this fluid then some of the light rays hitting the peripheral interface between the probe and the fluid under measurement will be refracted into the fluid. The refraction of some of these light rays will take place because under these conditions these rays of light are caused to hit the interface formed between the peripheral portions of the probe 80 and the fluid 27 at an angle which is less than the critical angle which exists because of the preselected relationship existing between the index of refraction of the fluid 27 and the probe 80 when the light enters the selected beveled surface, e.g., 90 of the probe 80.

This beveled edgeprobe structure angularly displaced optical bench and light measuring cell allows rays of light in the form of an ellipse to enter a beveled edge portion of a light entry end of an immersion probe which has a preselected cut-off angle in such a way that these rays will hit only a preselected critical angle of incidence when they come in contact with the interface surface that is established between peripheral portions of the probe and a fluid in contact therewith whose index is to be measured.

The optical bench together with the aforementioned measuring cell which covers all but the light entry beveled end portion of the probe thus provides a way of maintaining the intensity of light rays being refracted out of the probe against the measuring cell substantially equal to the intensity of these light rays when they initally entered the probe under a condition in which the fluid under measurement is at a preselected desired index of refraction and the light entering the probe is hitting the interface established between the peripheral surfaces of the probe and the fluid at the critical angle that is established between these two substances.

From the aforementioned description of the index of refraction measuring apparatus it can be seen that a unique beveled edgeprobe structure having an adjustable optical bench and light sensing measuring cell has been disclosed herein which is capable of measuring that magnitude to which the index of refraction of a fluid under measurement deviates from a preselected value.

What is claimed is:

1. A light to electrical energy transforming apparatus for continuously indicating the index of refraction of a fluid stream, comprising the combination of a solid, transparent, light transmitting rod, a light emitting optical means, a light responsive means and an index of refraction indicator operably connected to the responsive means, said rod being comprised of a flat coated light reflecting surface at one end thereof, an inclosure forming a fluid tight chamber about the coated end of the rod, a light emitting flat end surface portion and a chamfered surface portion forming an opposite end of the rod, said light responsive means being positioned to cover the entire light emitting flat end surface portion of the rod to receive substantially all of the light emitted therethrough, the light emitting optical means comprising a light source, lenses and an aperture formed by the surface of a beveled-shaped wall operably positioned to focus light rays substantially in the form of an elliptical-shaped bundle against said chamfered surface into the rod and thence at a preselected critical angle of incidence against peripheral side wall portions thereof that form an interface with said fluid stream, said light transmitting rod structure affording substantially no refraction of light from said rod to said fluid stream when the index of refraction of said fluid stream is at a value which is greater than said preselected value, said structure further affording a partial loss in light refracted through the side wall of said rod to the fluid stream when the index of refraction of the fluid stream is at a value which is greater than said preselected value, and an electrical conductor means connecting the light responsive means in circuit with the index of refraction indicator for transmitting thereto an electrical signal that is proportional to the magnitude of the index of refraction of the fluid stream.

2. A light to electrical transforming apparatus for continuously indicating the index of refraction of a fluid stream, comprising the combination of a solid transparent light transmitting rod, a light emitting optical means, a light responsive means and an index of refraction indicator, said rod being comprised of a flat light reflecting surface at one end thereof, an inclosure forming a fluid tight chamber about the coated end of the rod, a light emitting flat end surface portion and a chamfered surface portion forming an opposite end of the rod, said light responsive means being positioned to cover the entire light emitting, flat end surface portion of the rod to receive substantially all of the light refracted therethrough, the light emitting optical means comprising a light source, lenses and an aperture formed by the surface of a beveled-shaped wall operably positioned to emit a bundle of light rays which are elongated in one plane substantially normal to the chamfered surface portion against this surface portion into the rod and thence at a preselected critical angle of incidence against peripheral surface portions of the side wall that is in contact with said fluid stream, said light transmitting rod structure affording substantially no refraction of light to said fluid when the index of refraction of said fluid is at a value that is equal to or below a preselected value, said rod structure further affording a proportionate increase in loss in light refracted through the side wall of the rod to the fluid under a condition in which the index of refraction of the fluid is being increased beyond the preselected value, said rod structure being operable to afford a proportionate decrease in the loss in the light refracted through the side wall of the rod into the fluid stream under a condition in which the index of refraction of the fluid stream is being lowered from a value which exceeds said preselected index of refraction value, and an electrical conductor means connecting the light responsive means in circuit with the indicator to transmit an electrical signal to the indicator whose magnitude varies in accordance with the quantity of the light that is refracted out of said rod into said fluid stream.

3. A continuous light transmitting apparatus, comprising a transparent rod having a coated light reflecting end, an inclosure forming a fluid tight chamber about the coated end of the rod, said external surface of the chamber and a longitudinal portion of the rod extending therefrom being adapted to be immersed in a fluid stream for measuring changes in the index of refraction of the fluid stream from a preselected value, said rod having another end out of contact with the fluid stream, said other end of the rod having a chamfered surface portion of a preselected angle with respect to a flat surface portion forming a remaining surface of the last-mentioned end, a light emitting means operably positioned to transmit a frusto-conical bundle of light rays of a diminishing cross-section against and through the chamfered surface portion, said angle of said chamfered surface portion being of a preselected value to refract the light rays passing therethrough against the peripheral side wall portions of the longitudinal portion of the rod at a preselected critical angle that exists between the rod and the fluid into which the rod is immersed, and a light sensing cell positioned immediately adjacent the flat end surface portion at the non-immersed end of the rod to sense the amount of light energy being emitted therethrough.

4. The light transmitting apparatus defined in claim 3 wherein a filter having substantially the same light absorbing characteristics as said rod is positioned at a preselected fixed distance from the emitting means, a light sensing reference cell positioned to receive light from the light emitting means that has passed through said filter, and a light energy responsive circuit operably connected to said cells to measure the ratio that exists between the light energy sensed between each of said cells and thereby provide a measurement of the index of refraction of the fluid under measurement.

5. The light transmitting apparatus, as defined in claim 3, wherein an opaque two-part mask is employed to surround the entire peripheral side wall surface of the end of the rod having the chamfered surface portion thereon to thereby prevent ambient light from being emitted against the chamfered surface portion when said preselected angle of the chamfered surface portion is of a substantially acute angle with the associated remaining flat surface portion immediately adjacent thereto, and disconnecting means to remove one of said parts from its associated mask part to thereby expose a portion of the chamfered surface portion to light that is emitted from said light emitting means under a condition in which said preselected angle of said chamfered surface portion is of a substantially obtuse angle with its associated remaining flat surface portion.

6. A continuous light transmitting apparatus, comprising a transparent rod, said rod having a coated light reflecting end, an inclosure forming a fluid tight chamber about the coated end of the rod, the external surface of the inclosure and a longitudinal portion of the rod extending therefrom adapted to be inserted in a fluid stream for measuring changes occurring in the index of refraction of the fluid stream from a preselected value, a portion of said other end of the rod having a chamfered surface displaced at a preselected angle with respect to an associated flat surface portion forming a remaining surface of said last-mentioned end, a light emitting means positioned to emit a beam of light against a substantially elliptical cross-section of the chamfered surface portion, said angle of the chamfered surface portion being of a value to refract the beam of light passing therethrough through the rod and thence against the peripheral side wall surface of the longitudinal portion of the rod at a preselected critical angle that exists between the rod and the fluid when said fluid is at the preselected index of refraction, and a light sensing measuring cell positioned immediately adjacent the flat end surface portion at the nonimmersed end of the rod to sense the amount of light energy being emitted therefrom.

7. The light transmitting apparatus, as defined in claim 6, wherein a filter having substantially the same light absorbing characteristics as said rod is positioned at a preselected fixed distance from the light emitting means, a light sensing cell positioned adjacent said filter to receive light from the light emitting means that has passed through said filter, and a light energy responsive circuit operably connected to the cells to measure the ratio that exists between the light energy sensed by each of said cells and thereby provide a measurement of the index of refraction of the fluid under measurement.

References Cited by the Examiner
UNITED STATES PATENTS

| | | | |
|---|---|---|---|
| 2,394,949 | 2/1946 | Straat | 88—14 |
| 2,727,997 | 12/1955 | Schofield | 88—14 X |
| 2,885,923 | 5/1959 | Simmons | 88—14 |
| 2,964,993 | 12/1960 | Witt | 88—14 |
| 3,017,802 | 1/1962 | Witt | 88—14 |
| 3,163,767 | 12/1964 | Witt et al. | 88—1 X |

JEWELL H. PEDERSEN, *Primary Examiner.*

E. G. ANDERSON, *Examiner.*

T. L. HUDSON, J. K. CORBIN, *Assistant Examiners.*